(12) United States Patent
Liu et al.

(10) Patent No.: US 9,846,569 B1
(45) Date of Patent: Dec. 19, 2017

(54) RANDOM VALUES BASED ON A RANDOM COMPONENTS OF NOISE

(71) Applicant: Seagate Technology LLC, Cupertino, CA (US)

(72) Inventors: Xiong Liu, Singapore (SG); Quan Li, Singapore (SG); Yew Meng Tan, Singapore (SG); WenXiang Xie, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 267 days.

(21) Appl. No.: 14/543,634

(22) Filed: Nov. 17, 2014

(51) Int. Cl.
*G06F 7/58* (2006.01)

(52) U.S. Cl.
CPC .................... *G06F 7/588* (2013.01)

(58) Field of Classification Search
CPC ........................................ G06F 7/588
USPC .................................. 708/250–256
See application file for complete search history.

(56) References Cited

U.S. PATENT DOCUMENTS

| 8,521,795 | B2 | 8/2013 | Fukushima et al. |
| 2008/0136697 | A1* | 6/2008 | Cho .................... G06F 7/588 341/155 |
| 2013/0073598 | A1 | 3/2013 | Jacobson et al. |
| 2014/0108478 | A1* | 4/2014 | Lee .................... G06F 7/588 708/250 |
| 2014/0143291 | A1* | 5/2014 | Idgunji .................. G06F 7/582 708/250 |
| 2014/0195576 | A1* | 7/2014 | Kaplan .................. G06F 7/588 708/250 |

OTHER PUBLICATIONS

Kamal, Ibrahim, 8-Bit Digital to Analog Converter (DAC), Oct. 30, 2013, Ika Logic, pp. 1-13.*
Wikipedia, Processor Register, Nov. 12, 2013, pp. 1-6.*

* cited by examiner

*Primary Examiner* — Tan V. Mai
(74) *Attorney, Agent, or Firm* — Cesari & Reed, LLP; Kirk A. Cesari; Logan Brown

(57) ABSTRACT

Systems and methods of generating random values based on random components of the noise are presented. A signal having at least a noise component(s) can be received and one or more random values can be calculated from the noise component(s). In some examples, noise can be received from a random source and common mode portions of the data can be filtered. A data channel can then process the noise to produce random data, which can be further processed by security circuits to generate random values, seed values, random numbers, and other values.

20 Claims, 4 Drawing Sheets

RANDOM VALUES BASED ON A RANDOM COMPONENTS OF NOISE

SUMMARY

In some embodiments, an apparatus may comprise a circuit configured to receive noise from a randomness source, increase random components of the noise, and generate a random value based on the noise.

In some embodiments, a system can include a circuit configured to receive an input signal having at least some noise, increase random components of the input noise, and generate a random value based on the random components.

In some embodiments, a method can include receiving input noise from a noise source, increasing random components of the input noise, and generating a random value based on the input noise.

DETAILED DESCRIPTION

Figure 1:
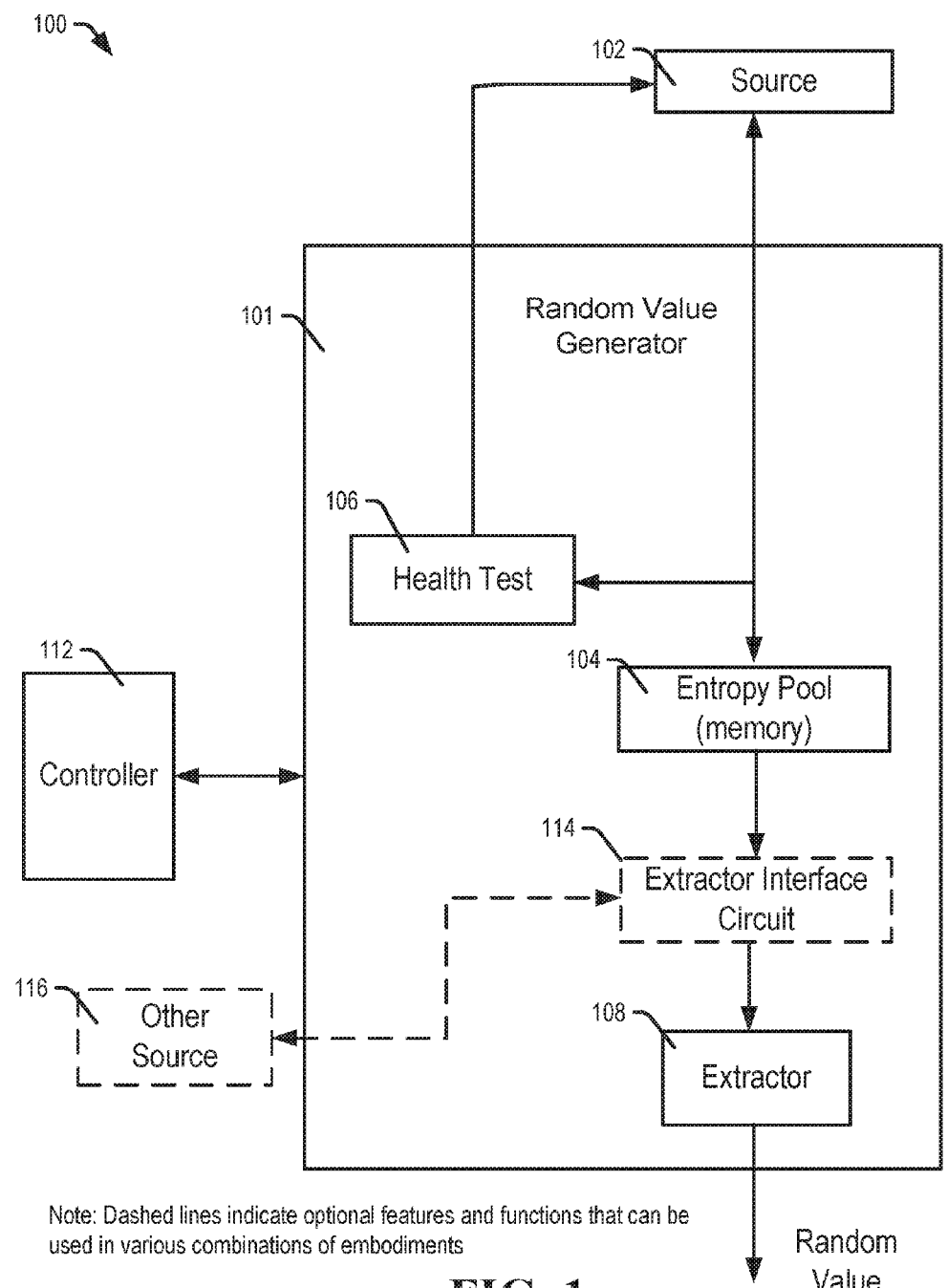
FIG. 1 is a diagram of a system configured to generate random values based on a random value generator, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a processor or controller. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

With an increasing amount of digital information stored in data storage devices, particularly confidential or personal information, there are real concerns about the digital information falling into unauthorized hands. Consumers should demand higher levels of security to protect their information in the event that their data storage device is lost or stolen.

One way to enhance the integrity of a security system is to use true random numbers as a basis for encryption. True random numbers may be seeded by true random source, are not reproducible, and are aperiodic (i.e. the sequence does not repeat itself except by chance). Pseudorandom numbers can be generated with mathematical formulae or via a pre-calculated table to generate numbers that appear random even though they may be reproducible and periodic.

Examples are provided herein illustrating a system of generating random values from a randomness source. The randomness source may be a data channel, transmission medium (including a wireless medium), radiation source, or other source. In some embodiments, noise may come from a magnetoresistive ("MR") source (i.e. MR reader). In some embodiments, an MR source is a resistive device whose random noise changes when applying a constant voltage. In other examples, an MR source can be a transducer, such as a recording head commonly found in data storage devices, or other devices that produce a noise in response to an applied voltage.

In electronics, noise is a random fluctuation in an electrical signal, a characteristic of all electronic circuits. In communication systems, noise is an error or undesired random disturbance of a useful information signal in a communication channel. However, noise can also mean signals that are random (unpredictable) and carry no useful information; even if they are not interfering with other signals or may have been introduced intentionally.

Electrical pulse currents generated in the recording head while it is passing over a storage medium (e.g. magnetic disc medium) in read mode, or while an actuator is parked on a ramp, can contain a significant amount of noise. Sensitive electronics in a data channel can amplify noise from the recording head, and decode the pulse currents corresponding to the data stored on the disc medium.

Examples are provided herein of random value generator circuits that can generate random values by amplifying noise from a randomness source (e.g. recording head).

The random values may be used as a random number or seed data that can be provided to a random number generator, encryption circuit, or other circuits. For example, random values may be used for data encryption, which may include the transformation of an input data sequence (e.g. plaintext) to an encrypted output data sequence (e.g. cipher text) using a selected encryption method (e.g. a cipher). Encryption circuits can include ciphers and can use one or more pieces of auxiliary data (e.g. encryption keys) to encrypt the plaintext by various encryption methods. Encryption strength can depend on how difficult the encryption keys are to replicate. Thus, encryption keys with more randomness that are harder to replicate can provide a stronger encryption than encryption keys with less randomness.

To help generate stronger keys, random number generators can be used. A random number generator may generate random numbers based on seed values. When a seed is predictable, the encryption keys may be easy to replicate and the encryption may be weaker. Thus, encryption keys based on seeds that are more random (e.g. have a high amount of entropy) are more difficult to replicate and can be used to provide stronger encryption keys that can produce cipher text that is difficult to decipher.

Examples are provided herein of random value generator circuits (which themselves could be random number generators) that can generate random values (or seeds) based on a data channel.

Referring to FIG. 1, certain embodiments of a system configured to generate random values based on a random value generator are shown and generally designated 100. The system 100 can include a random value generator 101, random source 102, and controller circuit 112. The random value generator 101 can include an entropy pool 104, health test circuit 106, and extractor circuit 108. The random value generator 101 may be coupled to the controller circuit 112.

In some embodiments, the randomness source 102 may be a transducer, receiver, data channel, or other source from which random data may be received. The health test circuit 106 may be coupled to the randomness source 102.

The entropy pool 104 may be coupled to the source 102, and may be a memory, such as a first in first out (FIFO) buffer, or other memory. In some examples, the entropy pool 104 may be a memory in a data channel, and may be coupled to the extractor circuit 108. In some cases, the extractor circuit 108 may be a processor or controller configured to execute instructions stored in a memory, such as firmware or software, and so forth.

During operation, the randomness source 102 can produce random data and the random value generator 101 can store the random data to the entropy pool 104. The health test circuit 106 can check the random data in the entropy pool 104 to determine if the random data has enough randomness.

The controller circuit 112 can control the security circuits of a data storage device. For example, the controller circuit 112 can control the health test circuit 106 to determine if the random data has enough randomness, providing notice when there is not a minimum amount of randomness, providing a random value to a random number generator, provide the random value to the extractor circuit 108, and so forth. In some cases, the controller circuit 112 can control other activities of a data storage device, such as processing read and write commands.

The extractor circuit 108 can generate a random value by processing the random data. In some cases, the extractor circuit 110 may apply a function to an output of a weakly random entropy source (e.g. randomness source 102), together with a short, uniformly random seed to generate a highly random output that appears independent from the entropy source. Also, the output of the extractor 108 (i.e. random value) may be uniformly distributed. The extractor circuit 108 can provide the random value to a random number generator, encryption circuit, or other circuit.

In some embodiments, the system 100 can optionally include an extractor interface circuit 114. The extractor interface circuit 114 can combine random data from the entropy pool 104 with random data from an optional other randomness source 116 to produce combined random data. The combined random data may then be provided to the extractor 108.

All circuits and functions herein can be implemented as a system on chip, application specific integrated circuit (ASIC), hardware logic, field programmable gate array (FPGA), other circuits, executable firmware or software, or any combination thereof.

Figure 2:
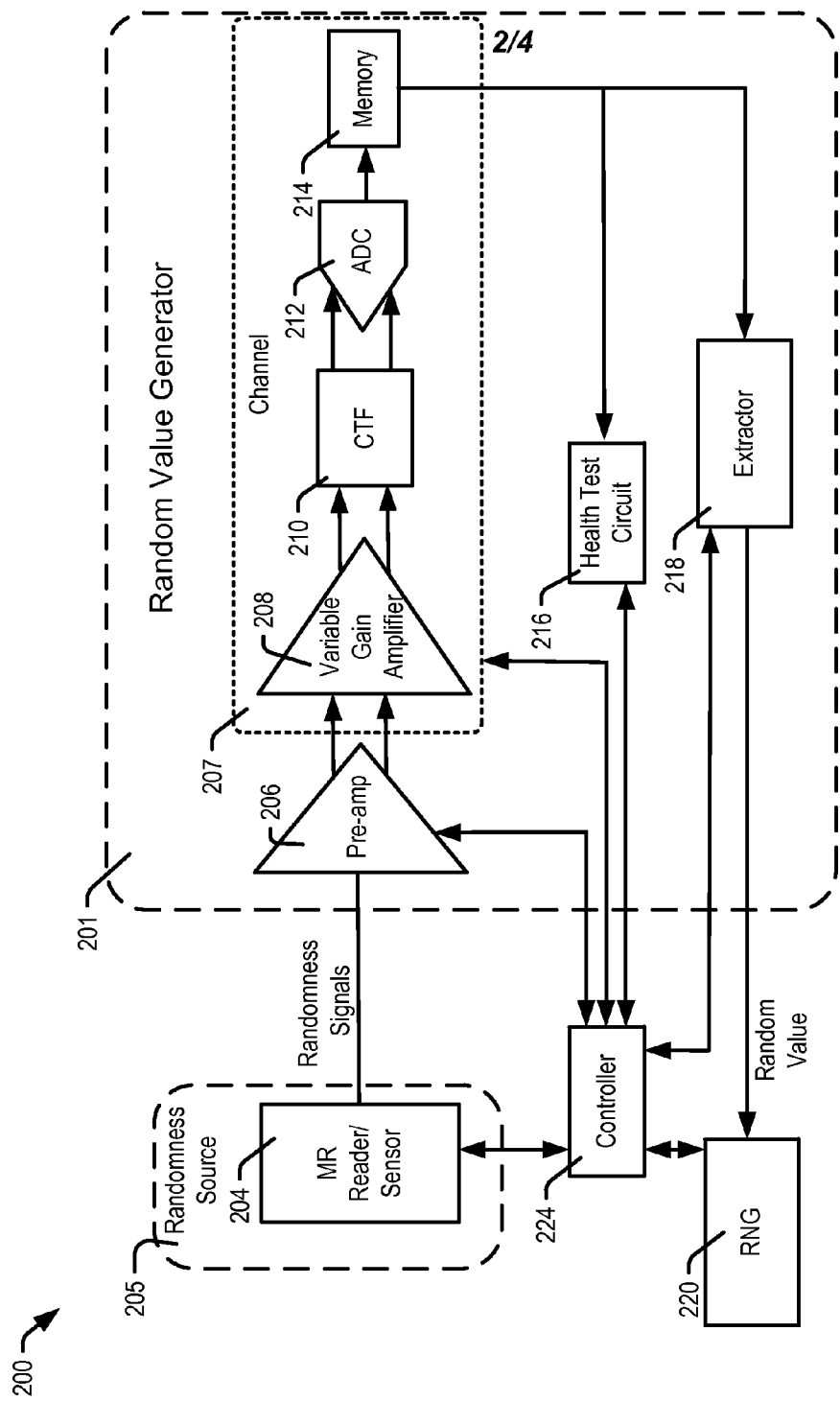
FIG. 2 is a diagram of a system configured to generate random values based on a random value generator, in accordance with certain embodiments of the present disclosure.

Referring to FIG. 2, a system configured to generate random values based on a random value generator is shown and generally designated 200. The system 200 is an example of system 100, according to certain embodiments. The system 200 can include a random value generator 201, randomness source 205, controller 224, and random number generator (RNG) 220. The random value generator 201 can include a pre-amp 206, data channel 207, health test circuit 216, and extractor 218. The data channel 207 may include a variable gain amplifier (VGA) 208, continuous time filter (CTF) 210, analog to digital converter (ADC) 212, and can be certain embodiments of the randomness source 102. The randomness source 205 may include an MR sensor 204.

An output of the randomness source 205 may be coupled to an input of the pre-amp circuit 206. In some examples, the randomness source 205 and the pre-amp 206 may be differentially coupled. In some embodiments, the pre-amp 206 may include a band-pass filter (BPF). The high frequency point (HPF) of the BPF may be selected to maintain spectrum flatness (i.e. the randomness) of the noise from the randomness source 205, and the low frequency point (LPF) may be selected to suppress very low components of the noise, some of which may be extremely high and may affect the randomness of ADC samples (see below). In an example, the HPF may be 3.0 GHz, and the LPF may be 0.15 MHz. In some embodiments, the BPF filter values may be selected to maintain or recover the spectrum of read back data, and for signal integrity. In some embodiments, the pre-amp circuit 206 may be connected to an external filter. In some examples, a filter may not be used.

Outputs of the pre-amp circuit 206 may be coupled to inputs of the VGA 208. Outputs of the VGA 208 may be coupled to inputs of the CTF 210, and outputs of the CTF 210 may be coupled inputs of the ADC 212. In some embodiments, the VGA 208, CTF 210, and ADC 212 may be independent circuits. In some examples, the VGA 208, CTF 210, and ADC 212, may be part of a system on chip, or may be integrated with the data channel 207, or other circuit(s). An output of the ADC 212 can be coupled to the memory 214. The memory 214 may be an example embodiment of the entropy pool 104.

An output of the memory 214 may be coupled to an input of the source memory and optionally to an input of the health test circuit 216. The health test circuit 216 may be coupled to the controller 224. The source memory may be coupled to an input of the extractor 218. An output of the extractor 218 may be coupled to an input the RNG 220. Inputs and outputs of the controller 224 may be coupled to the MR sensor 204, pre-amp 206, data channel 216, extractor 218, and RNG 220.

During operation, the randomness source 205 may generate noise. In some embodiments, the controller 224 can configure the randomness source 205 to generate noise. When the pre-amp 206 receives the noise, common mode rejection properties of the pre-amp 206 can reject components of the noise that are common mode (e.g. non-random), thus amplifying only random components of the noise. In some embodiments, the noise may contain white noise. White noise is noise with a constant power spectral density; that is, white noise has a high level of randomness across all frequencies.

The pre-amp 206 can condition the noise via amplification and filtering operations to produce conditioned noise. For example, the pre-amp 206 can be configured to amplify the noise to a maximum level, and can filter (e.g. low-pass, high-pass, band-pass) the noise to allow only a pre-determined pass-band of the noise into the VGA 208.

The VGA 208 can receive the conditioned noise from the pre-amp circuit, and further amplify it to a pre-determined level before the conditioned noise is received by the ADC 212. The gain of the VGA 208 can be controlled by a processor or controller, such as controller 224. The amount of the gain may be based on the amplitude of received data during normal recovery operation (e.g. data recovery), and may be dynamically changed with the amplitude of data during data acquisition or data tracking sections (operations). In some embodiments, the level to which the VGA 208 can amplify the conditioned noise may be selected to prevent a voltage on the input(s) of the ADC 212 from exceeding a specified range. For example, the gain of the VGA 208 can be adjusted to prevent the ADC 212 from entering a saturation stage. A saturation stage can cause the ADC 212 to generate to many ADC_max and ADC_min values (e.g. +31, or −32 for a 6 bit ADC, respectively), which may then cause the randomness of the ADC 212 samples to degrade.

The VGA 208 may provide the amplified noise to the CTF 210. In some systems, the CTF 210 may be part of a read signal path in the data channel 207. When the data channel 207 is in a read operation mode the CTF 210 may perform some filtering functions. However, when the data channel 207 is configured to generate random data, the CTF 210 may not be needed and can be configured as a pass through circuit to provide the amplified noise to the ADC 212. In some embodiments, the controller 224 set the operating mode of the data channel 207.

The ADC 212 can sample the amplified noise to generate random data. In some embodiments, the ADC 212 may continually sample the amplified noise to generate random data. In other embodiments, the ADC 212 may generate a set of random data (e.g. 1024 KB) upon detection of a trigger or when a request or indicator for random data is received. In data storage systems, a trigger may occur when a servo gate is detected. A servo gate can be a location on a disc data storage medium that can be used to protect a read-only area, such as a servo sector, from being overwritten.

The data sampled via the ADC 212 may be stored to the memory 214, and can be used as random data. In some embodiments, the health test circuit 216 can check the data in the memory 214 to determine if the data has enough randomness. The health test circuit 216 can check the data for randomness by performing biasing analysis, performing cross correlation analysis, autocorrelation analysis, other analysis, or any combination thereof. Biasing analysis is the measure of the probability of a bit of data becoming a '1' or '0' for the next outcome. The best value is 0.5, and an acceptable range may be 0.48 to 0.52. MR noise as a randomness source can reach between 0.497 and 0.503. Cross correlation is the measure of the dependency of a bit from another bit. The optimal value is zero, and an acceptable range may be less than eight percent (i.e. there is no dependency on eachother). MR noise as a randomness source can reach two percent. Autocorrelation shows where bits at an arbitrary offset (lags) are correlated or not. The benchmark is less than 15%. MR noise as a randomness source can have an autocorrelation less than two percent. When the health test circuit 216 determines there is an acceptable amount of randomness in the data, the data may be copied to a source memory, such as a primary cache or a flash memory. When there is not an acceptable level of randomness in the data, the health test circuit 216 can trigger the ADC 212 to generate more samples of data to be stored in the memory 214. In some cases, the health test circuit 216 can check the data for non-random or repeating data patterns.

In some examples, the health test circuit 216 can check each sample of data in a memory (e.g. memory 214, source memory) for randomness. In examples, the health test circuit 216 can test the data as the samples are received by the memory, read from the memory, periodically, or any combination thereof. In other examples, the health test circuit 216 can check at least a portion of the data for randomness. In some embodiments, sample(s) may be stored to the source memory when a minimum number of samples have an acceptable level of randomness. However, if none of the samples have an acceptable level of randomness, the ADC 212 may stop generating more data samples, and the extractor 218 can use the data already stored in the source memory to generate a random value. The random value generator 201 can inform a host, processor, controller, or other device about the error. In some cases, there may not be enough data stored in the source memory to send to the extractor 218. When this happens, an error message can be sent to the host, processor, or other device, and access to stored data may be prohibited. In some case, the error message may be sent to the controller 224.

The samples of random data stored by the source memory may be available to the extractor 218. The extractor 218 can process the samples of random data in the source memory to generate a random value or provide the random data to a random number generator ("RNG") 220. The RNG 220 may receive the random data or a random value(s) from the extractor and generate random number(s) based on the random data. In some cases, the controller 224 can cause the RNG 220 to generate random numbers.

In some embodiments, the system 200 can optionally include an extractor interface circuit. The extractor interface circuit may be coupled to the source memory, the extractor 218, and other randomness sources. The extractor interface can combine random data from the ADC 212 with random data from another randomness source to produce combined random data. The combined random data may then be provided to the extractor 218. In some embodiments, the extractor interface circuit can combine the random data via concatenation, addition, subtraction, exclusive-ORing, or other function(s).

It should be understood that the random value generator 201 can be implemented to work with other systems and in other configurations. The random value generator 201 can be configured to generate random data using different randomness sources (e.g. receivers, data channels, communication systems, and so forth). In some embodiments, the random value generator 201 may have more or fewer components.

Figure 3:
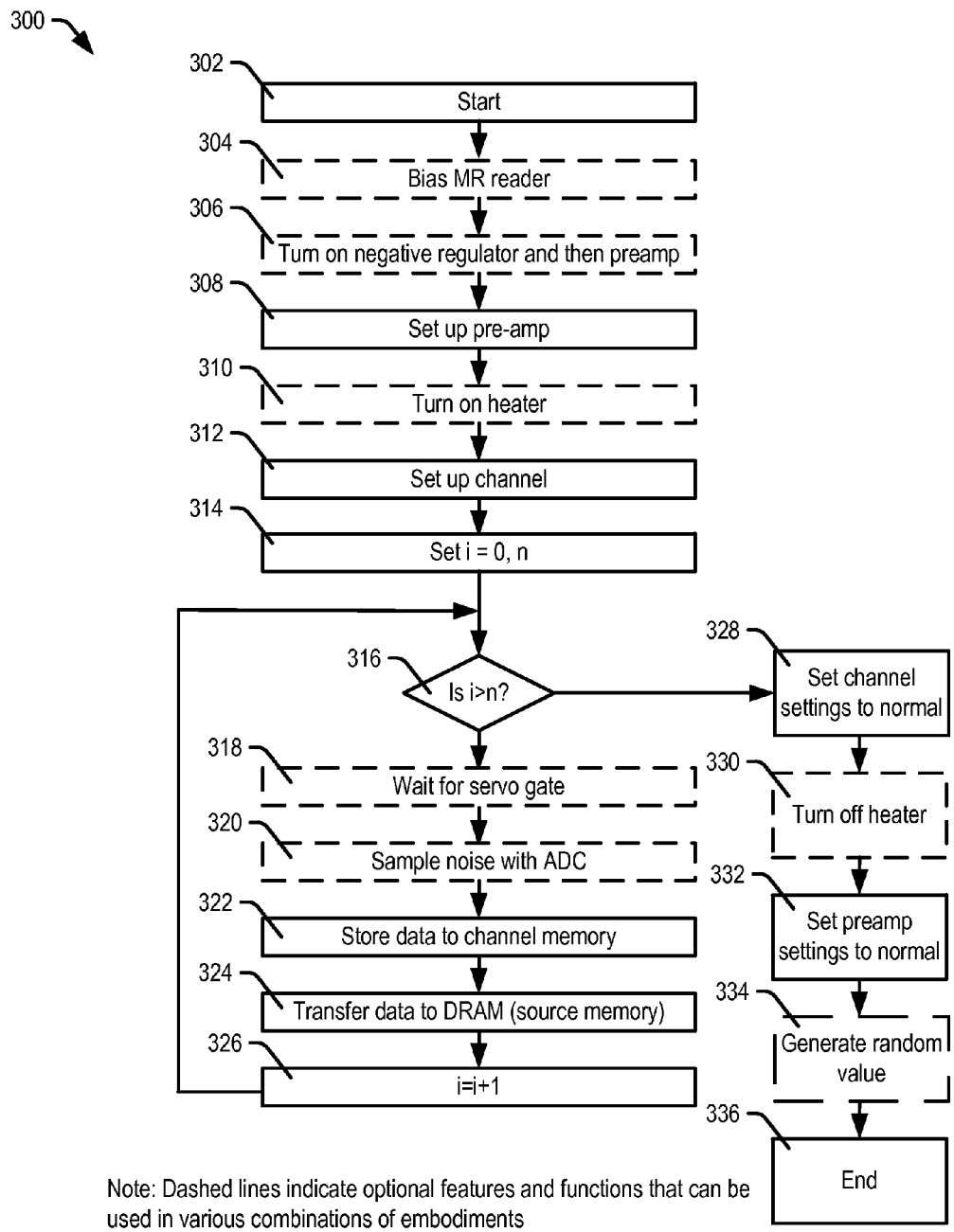
FIG. 3 is a flowchart of a method for generating random values based on a random value generator, in accordance with certain embodiments of the present disclosure.

Referring to FIG. 3, a flowchart of certain embodiments of methods for generating random values based on a random value generator is shown and generally designated 300. The method 300 may be implemented by the systems 100 or 200 described above. The method 300 can begin, at 302, when a trigger indicator is detected. In some embodiments, a trigger indicator may occur when a request for a random value(s) is received from an RNG, encryption circuit, or other circuit, or when a pre-determined condition is satisfied If the random source is a magnetic device or material, the method 300 may optionally bias an MR sensor, at 304. In some examples, an MR sensor may be biased when a source (e.g. a pre-amp circuit) applies a constant voltage across the MR sensor.

In some examples, the method 300 can optionally include turning on a negative regulator and pre-amp, at 306. During some modes of operation, drive firmware may have disabled the negative regulator. For example, the drive may have disabled the negative regulator when a recording head is parked on a ramp. Without the negative voltage generated by the negative regulator, the pre-amp circuit may not operate in an active mode. In some cases, random data generation may begin when the recording head is parked on a ramp.

Once the pre-amp is turned on, it may be configured to receive noise from the randomness source and generate conditioned noise, at 308. In some instances, configuring the pre-amp could include setting the gain, changing the input impedance (changing the input impedance may cause the power spectral density of the MR noise to flatten out), HPF, and LPF of the band-pass filter. Also, if applicable, high frequency boost (HFZ) settings may be changed. In some embodiments, a controller, processor, or other circuit can change the pre-amp settings.

Heating a randomness source may increase the randomness of the randomness data. For example, heating an MR reader may increase the amount of noise, thus increasing the randomness of the random value. The method 300 can optionally include turning on a heater, at 310.

When the pre-amp is setup, the method 300 can include setting up a data channel to generate random data based on the conditioned noise, at 312. In some embodiments, the data channel may quickly change operation modes from a reading or writing mode to a random value generation mode. When the data channel changes operating modes, some settings may change. For example, when the data channel enters a random value generation operation mode from a reading or writing mode, changes to the settings of a VGA, CTF, ADC, or other circuits may occur. In some instances, the ADC may be powered on and a default sampling frequency may be set. In some embodiments, the data channel can change operation modes (or settings) based on instructions sent by controller, processor, or other circuit.

Each time the ADC samples the conditioned noise, it can generate data that can be used as random data. In some cases, a minimum amount of sampled data may be required to generate a random value with a threshold level of randomness. If the sampled data is not continually sampled, a threshold number of sampling operations may be processed to generate a random value that meets or exceeds the threshold level of randomness.

A counter can keep track of a number of processed sampling operations. When the method 300 is started, a count of sampling operations can be reset, at 314. At 316, the method 300 can determine if the count of sampling operations is greater than the threshold number. In some examples, the threshold number represents how much random data should be processed to generate a random value having a minimum amount of randomness. The threshold value may be based on the size of the data samples, storage capacity of a memory, and so forth. For example, a system requiring 32,768 KB of random data, and having memory with a 1024 KB capacity, could have a threshold value of 32; thus the ADC can generate 32 data samples of 1024 KB random data.

When the count of sampling operations is less than the threshold value, the method 300 can optionally include waiting for a trigger to be detected, at 318. In some embodiments, the trigger may be a servo gate, although in some embodiments, the trigger may be an expiration of a timer, a clock pulse, position sensor, or other trigger source. In some cases, the method may not include detecting a trigger.

Once a trigger is detected (if applicable), the conditioned noise may optionally be sampled to produce data that can be used as random data, at 320. In some embodiments, an ADC can digitize the conditioned noise to produce data that may be used as random data. In some examples, the conditioned noise may be continuously sampled, and the data may be stored to a buffer, at 322. When a trigger is detected, the data may be copied from the buffer to a source memory, such as a random access memory (RAM), non-volatile solid state memory, or other memory, at 324. An example of a trigger can be when the buffer has a maximum amount of data.

The method 300 can optionally include generating a random value, at 334, based on the data samples. An extractor can process the data samples from the source memory to generate the random value. In some cases, the random value may be provided to an RNG, encryption circuit, or other circuit. The method 300 can end, at 336.

When the count of sampling operations is greater than the threshold value, at 316, the method 300 can include changing the data channel settings to a default configuration, at 328, although the data channel can be set to other configurations. In some embodiments, the method 300 may optionally include turning off a heater, at 330, and configuring the pre-amp to operate in a default configuration, at 332. If a heater was not used, operation 330 may be ignored. In some embodiments, the pre-amp may be set to operate with a different configuration (e.g. gain, filter settings, etc.).

It should be understood that the order in which operations are processed may change. For example, the data channel may be set up before the pre-amp, the heater may be turned on after the data channel is setup, and so forth. It should also be understood that the operations discussed in the method 300 can be applied to systems adapted to work with other sources of random data, such as radiation sources, and so forth.

Figure 4:
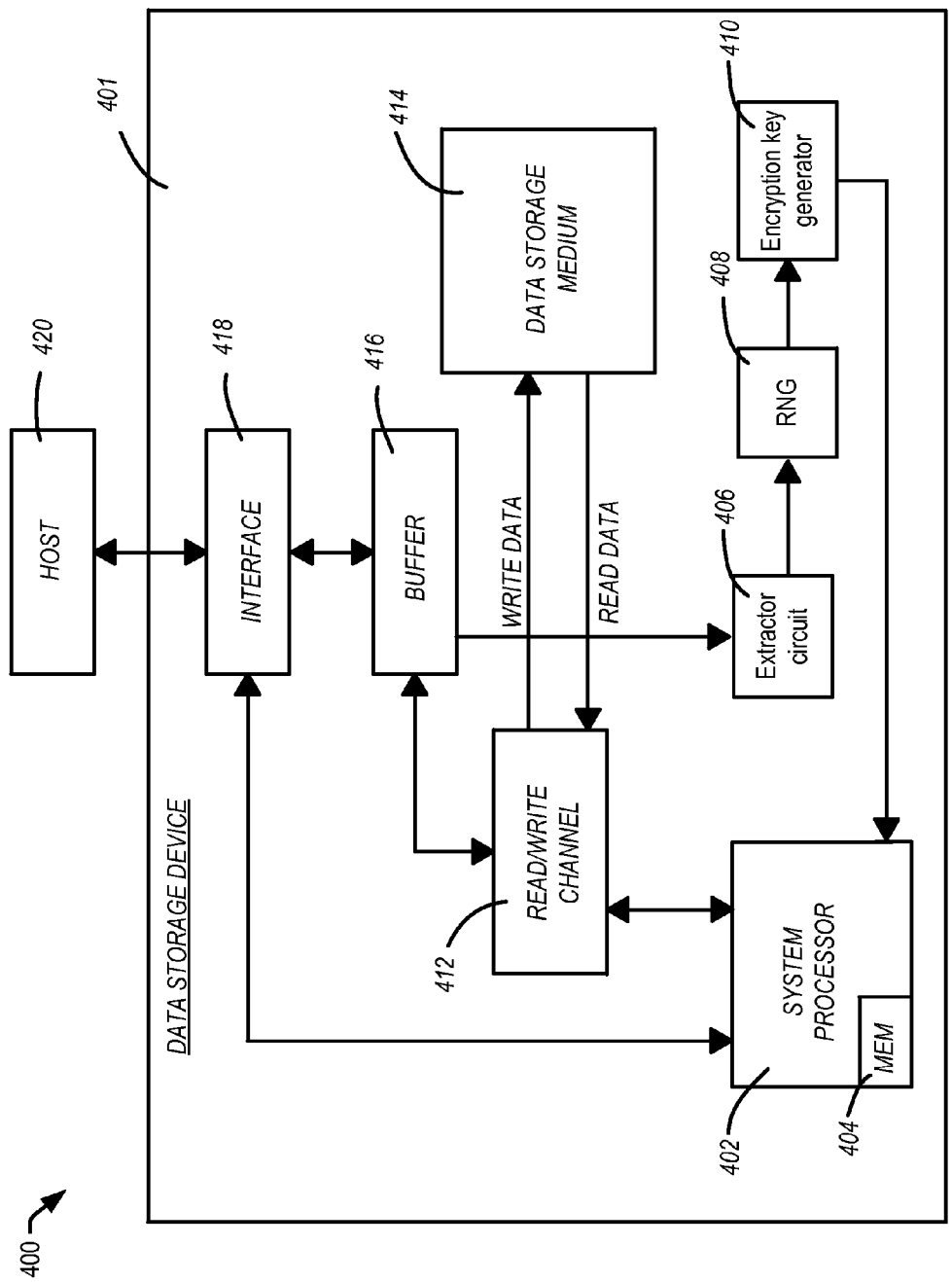
FIG. 4 is a diagram of a system configured to generate random values based on a random value generator, in accordance with certain embodiments of the present disclosure.

Referring to FIG. 4, a system configured to generate random values based on a random value generator is shown and generally designated 400. The system 400 can be an example of a data storage device (DSD), and is an example of systems 100, 200, and 300 according to certain embodiments. The DSD 401 can optionally connect to be removable from a host device 420. The data storage device 401 can communicate with the host device 420 via the hardware/firmware based host interface circuit 418 that may include a connector that allows the DSD 401 to be physically connected and disconnected from the host 420.

The DSD 401 can include a system processor 402, which may be a programmable controller, and associated memory 404. The system processor 402 may be part of a system on chip (SOC). A memory 416 may temporarily store data for read and write operations, and can include a command queue. The read-write (R/W) channel 412 can encode data during write operations to, and decode data during read operations from, the data storage medium 414. The R/W channel 412 may generate random data based on noise, which may come from a transducer (e.g. recording head) configured to read data from the data storage medium 414. The memory 416 may store the random data, and may provide the random data to an extractor circuit 406.

The extractor circuit 406 may generate a random value based on the random data. One of the ways the extractor circuit 406 can generate a random value is by processing a least significant digit of the random data. In some embodiments, the extractor circuit 406 can generate the random value by performing mathematic operations (e.g. addition, subtraction), logic operation (e.g. exclusive-or), concatenation, or other operations on the random data.

In some embodiments, the random value can be used for random number generation, encryption key generation, other security functions, or any combination thereof. For example, the extractor circuit 406 can provide the random value to an RNG 408, which can generate a random number based on the random value and provide the random number to an encryption key generator 410. The encryption key generator 410 can generate one or more encryption key(s) based on the random number and provide the encryption key(s) to the system processor 402 or other encryption circuit, which may use the encryption key(s) to encrypt data for storage on the data storage medium 414. Also, they keys can encrypt data for transmission to the host 420, or for other purposes.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a magnetoresistance (MR) sensor configured to produce an input signal from a magnetic disc medium, the input signal having at least some noise;
    a random value generator circuit including a pre-amp and an extractor circuit, the random value generator circuit configured to:
        receive, at an input of the pre-amp, the input signal having at least some noise from the MR sensor;
        increase, at least in part by the pre-amp, random components of the noise at least in part by:
            amplifying the noise; and
            rejecting common mode components present in the amplified noise to produce conditioned noise; and
        generate, by the extractor circuit, a random value based on the random components in the conditioned noise; and
    a random number generator configured to generate a random number based on the random value.

2. The apparatus of claim 1 comprising the pre-amp further configured to perform the rejecting of the common mode components present in the amplified noise at least in part by:
    filtering the amplified noise.

3. The apparatus of claim 2 comprising the random value generator circuit further includes:
    an analog to digital converter (ADC) configured to sample the conditioned noise to produce sampled data;
    a memory configured to store the sampled data; and
    the extractor circuit configured to perform the generating of the random value based on the random components by generating the random value based on the sampled data.

4. The apparatus of claim 3 comprising the random value generator circuit further includes:
    a health test circuit configured to check the sampled data to determine if the sampled data has a threshold level of randomness.

5. The apparatus of claim 4 comprising the random value generator circuit further configured to:
    when the sampled data does not have the threshold level of randomness, generate, by the ADC, another sampled data, and increment a count; and
    when the count exceeds a threshold number, stop generating the sampled data and provide a notice that the threshold level of randomness was not generated.

6. The apparatus of claim 1 further comprising:
    the random value generator circuit further configured to:
        configure the pre-amp to operate in a random value generation mode that increases random components of the noise by:
            setting one or more of an input impedance of the pre-amp, a high pass filter of the pre-amp, a low pass filter of the pre-amp, a band pass filter of the pre-amp and a high frequency boost of the pre-amp to reject the components of the amplified noise that are common mode.

7. A system comprising:
    a random value generator circuit including a pre-amp and an extractor circuit, the random value generator circuit configured to:
        receive, at an input of the pre-amp, an input signal having at least some noise;
        increase, at least in part by the pre-amp, random components of the noise by:
            amplifying the noise; and
            rejecting components of the amplified noise that are common mode to produce conditioned noise; and
        generate, by the extractor circuit, a random value based on the random components in the conditioned noise; and
    a random number generator configured to generate a random number based on the random value.

8. The system of claim 7 further comprising:
    a magnetoresistance (MR) sensor coupled to the random value generator circuit and configured to sense the input signal and provide the input signal to the random value generator circuit.

9. The system of claim 7 comprising the pre-amp further configured to perform the rejecting of the components of the amplified noise that are common mode at least in part by:
    filtering the amplified noise.

10. The system of claim 8 further comprising the MR sensor configured to generate the input signal when a constant voltage is applied across the MR sensor to bias the MR sensor.

11. The system of claim 7 comprising the random value generator circuit further includes:
    a data channel coupled to the pre-amp;
    the data channel includes:
        a variable gain amplifier (VGA) circuit configured to amplify the conditioned noise to produce amplified conditioned noise;
        an analog to digital converter coupled to the VGA and configured to generate sampled data based on the amplified conditioned noise; and
        a memory configured to store the sampled data.

12. The system of claim 11 further comprising the random value generator circuit further includes:

the extractor circuit configured to receive the sampled data from the memory and process the sampled data to calculate the random value based on the random components.

13. The system of claim 12 further comprising the random value generator circuit further includes:
an extractor interface circuit configured to:
combine the sampled data with random data from a different randomness source to produce combined random data; and
provide the combined random data to the extractor circuit.

14. The system of claim 11 comprising the random value generator circuit further includes:
a health test circuit configured to:
determine if a set of the sampled data has a threshold level of randomness; and
when the sampled data does not have the threshold level of randomness, provide a notice that the sampled data does not have enough randomness.

15. The system of claim 7 further comprising:
the random value generator circuit further configured to:
configure the pre-amp to operate in a random value generation mode that increases random components of the noise by:
setting one or more of an input impedance of the pre-amp, a high pass filter of the pre-amp, a low pass filter of the pre-amp, a band pass filter of the pre-amp and a high frequency boost of the pre-amp to reject the components of the amplified noise that are common mode.

16. A method comprising:
sensing, at a magnetoresistance (MR) sensor, an input signal from a magnetic disc medium, the input signal including input noise;
receiving, at an input of a pre-amp, the input signal including the input noise from the MR sensor;
increasing, at least in part by the pre-amp, random components of the input noise by:
amplifying the input noise; and
rejecting components of the amplified noise that are common mode to produce conditioned noise; and
generating, by an extractor circuit, a random value based on random components of the conditioned noise.

17. The method of claim 16 further comprising:
configuring the pre-amp to operate in a random value generation mode including receiving the input noise and conditioning the input noise to generate conditioned noise by setting one or more of an input impedance of the pre-amp, a high pass filter of the pre-amp, a low pass filter of the pre-amp, a band pass filter of the pre-amp and a high frequency boost of the pre-amp to reject the components of the amplified noise that are common mode; and
configuring a data channel to operate in the random value generation mode by configuring the data channel to process the conditioned noise to generate sampled data.

18. The method of claim 17 further comprising:
upon detection of a trigger indicator, sampling the conditioned noise to generate the sampled data;
storing the sampled data to a memory; and
processing the sampled data to produce a random value.

19. The method of claim 18 further comprising:
determine a count of samples of the sampled data; and
when the count is greater than a threshold value, generating the sampled data upon detection of another trigger.

20. The method of claim 17 further comprising:
configuring the pre-amp to operate in a mode other than the random value generation mode, and configuring the data channel to operate in a mode other than the random value generation mode.

* * * * *